United States Patent
Setterberg et al.

(10) Patent No.: US 11,623,498 B2
(45) Date of Patent: Apr. 11, 2023

(54) PRE ACCLIMATIZATION SYSTEM

(71) Applicant: Ningbo Geely Automobile Research & Development Co., Ltd., Ningbo (CN)

(72) Inventors: Johan Setterberg, Gothenburg (SE); Jonathan Johansson, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/151,501

(22) Filed: Jan. 18, 2021

(65) Prior Publication Data
US 2021/0162837 A1   Jun. 3, 2021

Related U.S. Application Data

(63) Continuation of application No. PCT/CN2019/101124, filed on Aug. 16, 2019.

(30) Foreign Application Priority Data

Aug. 17, 2018 (EP) .................................... 18189603

(51) Int. Cl.
*B60H 1/00* (2006.01)
(52) U.S. Cl.
CPC ..... *B60H 1/00964* (2013.01); *B60H 1/00285* (2013.01); *B60H 1/00292* (2013.01); *B60H 1/00778* (2013.01); *B60H 1/00807* (2013.01)
(58) Field of Classification Search
None
See application file for complete search history.

(56) References Cited

U.S. PATENT DOCUMENTS 9,820,234 B2    11/2017  Dalke
9,862,246 B2 *   1/2018  Kikuchi ............. B60H 1/00742
                          (Continued)

FOREIGN PATENT DOCUMENTS

CN    101618720 A    1/2010
CN    104691451 A    6/2015
                          (Continued)

OTHER PUBLICATIONS

International Search Report from corresponding International Application No. PCT/CN2019/101124, dated Nov. 25, 2019, 2 pages.

*Primary Examiner* — Jenna M Hopkins
(74) *Attorney, Agent, or Firm* — Tucker Ellis LLP

(57) ABSTRACT

A method for activating a pre acclimatization system of the passenger compartment of a vehicle includes monitoring an operational state of the vehicle, including a first state in which the vehicle is on and a second state in which the vehicle is off. In the second state, the method includes monitoring a plurality of conditions, the conditions selected from a group including current time and date, a driver appointment schedule, a historical database, wherein the monitoring step is performed by a system controller incorporated into the vehicle. The method further includes determining the most probable time of departure of the vehicle from a present location based on the plurality of conditions monitored by the system controller, suggesting time of departure to the driver, monitoring reply from the driver, setting timer for activating the pre acclimatization according to reply from the driver, and activating sleep mode for the vehicle systems.

20 Claims, 2 Drawing Sheets

(56) References Cited

U.S. PATENT DOCUMENTS

| | | | |
|---|---|---|---|
| 9,975,400 B2* | 5/2018 | Farooq | B60H 1/00771 |
| 2009/0193821 A1* | 8/2009 | Ozeki | B60H 1/00742 |
| | | | 62/89 |
| 2011/0153140 A1* | 6/2011 | Datta | B60R 16/037 |
| | | | 701/1 |
| 2013/0079978 A1* | 3/2013 | Uyeki | B60H 1/00771 |
| | | | 701/36 |
| 2015/0345962 A1 | 12/2015 | Graham | |
| 2016/0107656 A1 | 4/2016 | Lovett | |
| 2016/0207375 A1* | 7/2016 | Gauthier | B60H 1/00771 |
| 2017/0134554 A1 | 5/2017 | Lee | |
| 2018/0059913 A1* | 3/2018 | Penilla | B60W 40/08 |

FOREIGN PATENT DOCUMENTS

| | | |
|---|---|---|
| CN | 105922844 A | 9/2016 |
| CN | 106794814 A | 5/2017 |
| DE | 102012217615 A1 | 5/2014 |
| JP | 2013180738 A | 9/2013 |

* cited by examiner

PRE ACCLIMATIZATION SYSTEM

RELATED APPLICATION DATA

This application is a continuation of International Patent Application No. PCT/CN2019/101124, filed Aug. 16, 2019, which claims the benefit of European Patent Application No. 18189603.6, filed Aug. 17, 2018, the disclosures of which are incorporated herein by reference in their entireties.

TECHNICAL FIELD

The present invention relates to a method for activating a pre acclimatization system of the passenger compartment of a vehicle.

BACKGROUND

User amenities in passenger vehicles that previously only were available for luxury vehicles are now more often found to be standard equipment for vehicles in other price ranges as well. For instance, some vehicles have a function that allows the user to set a timer in order to pre-heat or pre-cool the passenger compartment. The expected time of departure is set and depending on the ambient temperature compared to the desired temperature in the passenger compartment, the heater or cooler is programmed to start working sufficiently early enough to reach the desired temperature at the time of departure.

However, even if available, it is easily forgotten to set the timer. Also, with the increasing number of electrified vehicles, both pure electric and hybrid electric, there is a need to save as much of the battery power as possible if the vehicle is not plugged in to a power network and especially if the vehicle is left parked for an extended period of time since most batteries are discharged with time.

A battery's characteristics may vary over load cycle, over charge cycle, and over lifetime due to many factors including internal chemistry, current drain, and temperature. At low temperatures, a battery cannot deliver as much power. As such, in cold climates, some car owners install battery warmers, which are small electric heating pads that keep the car battery warm.

Batteries that are stored for a long period or that are discharged at a small fraction of the capacity lose capacity due to the presence of generally irreversible side reactions that consume charge carriers without producing current. This phenomenon is known as internal self-discharge. Further, when batteries are recharged, additional side reactions can occur, reducing capacity for subsequent discharges. After enough recharges, in essence all capacity is lost and the battery stops producing power.

Disposable batteries typically lose 8 to 20 percent of their original charge per year when stored at room temperature (20-30 C). This is known as the "self-discharge" rate, and is due to non-current-producing "side" chemical reactions that occur within the cell even when no load is applied. The rate of side reactions is reduced for batteries are stored at lower temperatures, although some can be damaged by freezing.

SUMMARY

It is an object of the present disclosure to provide a pre acclimatization system that is an improvement to those in prior art. The pre acclimatization system according to the present disclosure is defined by the appended claims.

According to a first aspect of the present disclosure a method for activating a pre acclimatization system of the passenger compartment of a vehicle is provided. The method comprises: monitoring an operational state of the vehicle, wherein the vehicle is on when said operational state corresponds to a first state, wherein the vehicle is off when said operational state corresponds to a second state, and wherein when said operational state corresponds to said second state, monitoring a plurality of conditions, wherein said plurality of conditions are selected from the group comprising current time and date, a driver appointment schedule, a historical database, wherein said monitoring step is performed by a system controller incorporated into the vehicle, determining the most probable time of departure of the vehicle from a present location based on said plurality of conditions monitored by said system controller, suggesting time of departure to driver, monitoring reply from driver, setting timer for activating said pre acclimatization according to reply from driver, and activating sleep mode for the vehicle systems.

There are generally 4 types of "sleep" for a vehicle. Normal sleep, for when you lock the car. In this state most functions are active and you can for instance use an app to check the status of the vehicle or order pre acclimatization.

The second one is deep sleep which normally is activated when the battery is low. In this state only the most crucial things are active, e.g. an alarm function and override using a physical key. For the present disclosure, sleep mode as claimed is this deep sleep state or deep sleep mode which means that only the alarm is active. Apart from a timer clock, the only other way to activate the systems is to use a physical key which overrides the timer. Thus, both the central electronic module or vehicle control unit and the climate control module are deactivated and the only way to activate these systems is by the timer clock or by using a physical key. The physical key could in this context be anything from an actual key to a remote key with an RFID access management control system with its own battery in the vehicle separate from the other vehicle power systems. Communication via an app is in this sleep mode, i.e. deep sleep mode not available.

The third type is the so called "transportation mode" which is normally not accessible by customer since it is used for transportations on trains, ships etc. from factory to car dealer. Finally, the fourth type is simply that the battery is off, i.e. no power left in the battery and consequently there are no functions available.

With prior art technology a vehicle waits for activation signals and stays awake a very long time and thus wastes energy when the vehicle is not used. It can be frustrating to not be able to activate the heater on a cold day due to low battery.

According to the present disclosure an algorithm collects data from for instance travel tickets, purchases, GPS position etc. and then proposes to put the car in sleep mode, i.e. deep sleep mode together with a scheduled activation. Thus, with such an algorithm, the vehicle is able to propose when it should be awake again, for instance when the train or flight arrives. For example, the vehicle collects data comprising that the user will go by plane and be gone for two weeks. The "timer" is set and the vehicle goes into sleep mode, deep sleep mode according to the present invention, and if it is cold where the vehicle is parked the heater is activated at the time of the scheduled arrival. If the ambient temperature is instead high where the vehicle is parked the cooler is activated rather than the heater. Thus, one of the advantages with the present disclosure is that there is provided a method which allows for lower battery drainage when the vehicle is not used.

According to a further aspect of the present disclosure the method further comprises waking the vehicle system at predetermined intervals, monitoring present plurality of conditions and determining the most probable time of departure of the vehicle based on the present conditions monitored. If the most probable time of departure determined differs from the previously set time of departure, the timer is set according to the most probable time of departure for activating said pre acclimatization and sleep mode, i.e. deep sleep mode is again activated for the vehicle systems.

Sometimes plans change and if the vehicle is in deep sleep mode, no communication is possible with the vehicle until the timer has passed its due date or the user is unlocking the vehicle just upon departure. By waking up the system for short moments at predetermined intervals it is possible to supply the control system of the vehicle with updated information. Also, this works as well the other way around if the user wants updated information about status on the vehicle via an app it is updated at the same predetermined intervals.

Preferably, the predetermined intervals is set to decrease in time when getting closer to the time of departure. For instance, if the expected departure is set two weeks ahead it might be enough to wake the vehicle every second day for the first week, every day the start of the second week and several times a day closer to the expected departure. One example of when this could be useful is for instance if the user is on a train that for some reason is delayed, via the app the expected time of departure could be updated manually or, if the arrival information is available online the control system of the vehicle could be updated automatically without any input needed from the user.

According to one alternative aspect of the disclosure the predetermined intervals is set for waking the vehicle system at least once every 24 hours if the set time of departure is more than 24 hours ahead. According to a further aspect the predetermined intervals is set for waking the vehicle system at least once every 6 hours if the set time of departure is less than 24 hours ahead.

Said driver appointment schedule is according to one aspect of the present disclosure monitored by said system controller by performing the step of synchronizing an on-board calendar with a calendar contained on a remote system, wherein said remote system is selected from a group comprising a cellular phone, a laptop computer, a tablet computer, a personal digital assistant, a smart watch, a computer system, and a network based computing system.

Preferably, the activation of said pre acclimatization system comprises determining a current passenger compartment temperature and comparing it to a preset temperature. If said current passenger compartment temperature is lower than said preset temperature said step of activating said pre acclimatization system further comprises the step of activating a passenger compartment heater. Said passenger compartment heater is preferably selected from the group comprising a heating, ventilation and air conditioning (HVAC) heater, a seat heater, and a steering wheel heater.

In order to save some power, said activating of said passenger compartment heater further preferably comprises activating a compartment air circulation system.

According to yet a further aspect of the present disclosure the activation of said pre acclimatization system comprises determining a current passenger compartment temperature and comparing it to a preset temperature. If said current passenger compartment temperature is higher than said preset temperature said step of activating said pre acclimatization system further comprises the step of activating a heating, ventilation and air conditioning (HVAC) cooling system.

Also for this case, the activating of said HVAC cooling system further preferably comprises activating a compartment air circulation system.

In another aspect of the present disclosure, the activation of said HVAC cooling system further comprises monitoring an elapsed time corresponding to said activating of the HVAC cooling system and comparing said elapsed time to a preset time interval. If said elapsed time is less than said preset time interval said system controller continues to perform said step of activating said HVAC cooling system, and wherein if said elapsed time is greater than said preset time interval said system controller terminates said step of activating said HVAC cooling system and activates a compartment air circulation system for a preset period of time. In other words, if the user is "late" to return to the vehicle, i.e. arrives after the estimated time of departure, the air circulation is activated in order to extend the time during which the preferred climate is kept at a desired level.

In order to save even more power and if specific conditions are met the ambient air could be used for pre acclimatization. Thus, according to a further aspect of the present disclosure the method further comprises determining a current passenger compartment temperature, determining an ambient air temperature, and comparing said current passenger compartment temperature to a preset temperature. If said current passenger compartment temperature is higher than said preset temperature said method further comprises comparing said current passenger compartment temperature to said ambient temperature. If said ambient air temperature is lower than said current passenger compartment temperature by a preset margin, said activation of said pre acclimatization system further comprises activating a ventilation system with external air intake.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION

Figure 1:
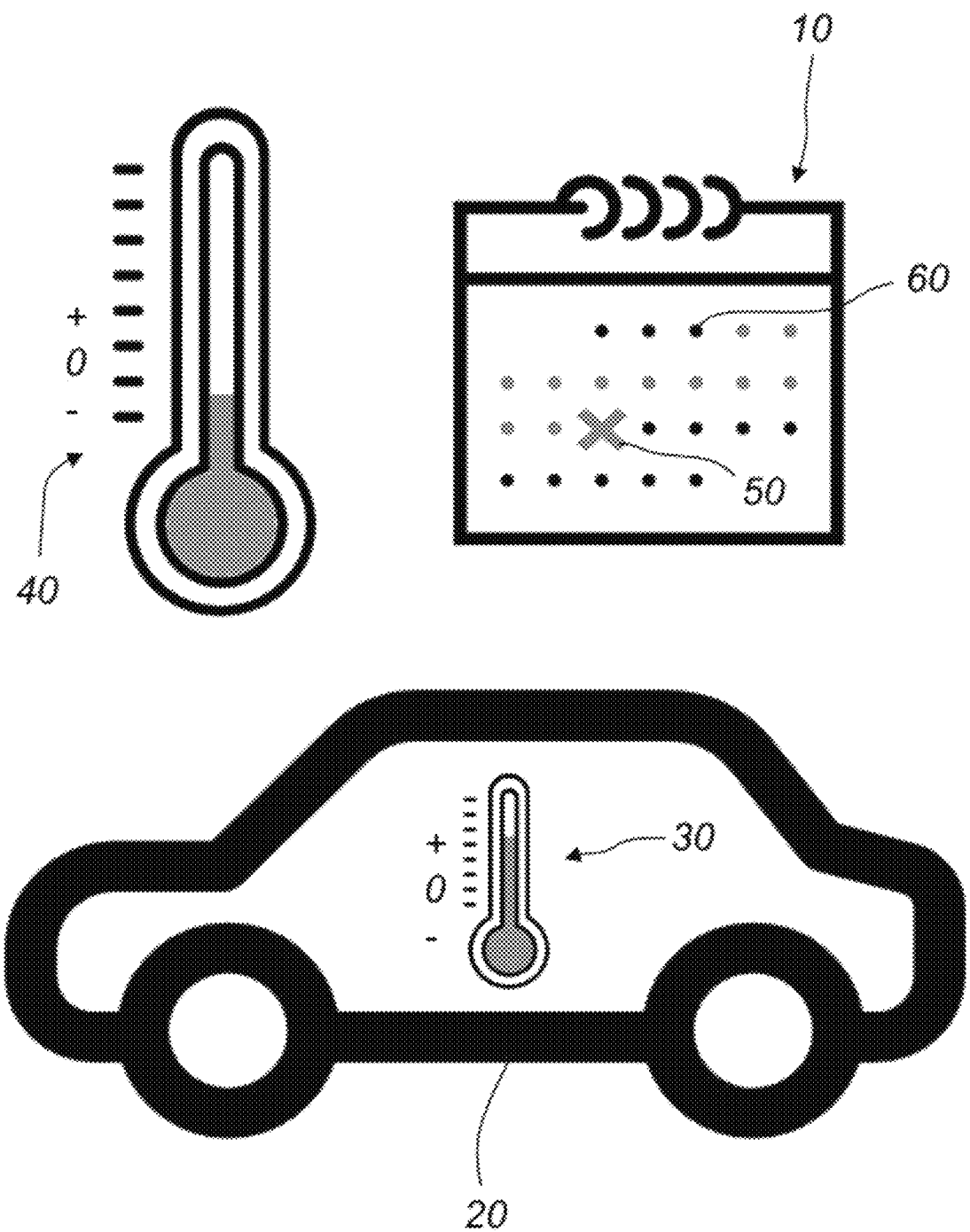
FIG. 1 is a simple visualization of a part of the idea behind the present disclosure.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to FIG. 1, in an app for the programming of the pre acclimatization according to the present disclosure there should be a special setting for long timer of pre acclimatization, for instance showing up like the calendar 10. In that app a user can set both time and date for when the vehicle should be pre acclimatizised. If for instance the symbols shown in FIG. 1 are shown in an app, the user could simply press the calendar 10 symbol that opens up such that date and time for departure can be set. Alternatively, the symbols simply show the user that there is a time and date set such as to give a confirmation that the system is programmed.

Further, the symbol with the vehicle 20 could be pressed in order to choose the desired temperature for the vehicle compartment. The schematic thermometer 30 could thus indicate what temperature is set. Optionally, the thermometer 30 could also show the current temperature of the vehicle compartment or somehow indicate with various colours of the "mercury" in the thermometer if the current temperature is above or below the desired temperature The calendar symbol 10 could show the expected time of departure 50 and the current date 60 could be visualized for instance by a different colour compared to the days between the current date 60 and expected time of departure 50 when the park will be parked and in deep sleep mode. A further option is to have an ambient temperature symbol 40 showing the current temperature in the area of the vehicle.

By using a system according to the present disclosure the vehicle "knows" it will be parked a specific time and can therefore go to sleep mode, i.e. deep sleep mode much earlier and thus saving power. Generally with prior art technology the vehicle could sit standby for several days and not have power for when the user arrives and wants the vehicle to pre acclimatize or even the range for electric drive mode could be shortened significantly in case it is a vehicle with an electric motor.

One advantage with the proposed method is that the relevant activities needed should only be software related, at least for the vehicles that are equipped with the prior art pre acclimatization hard ware.

Figure 2:
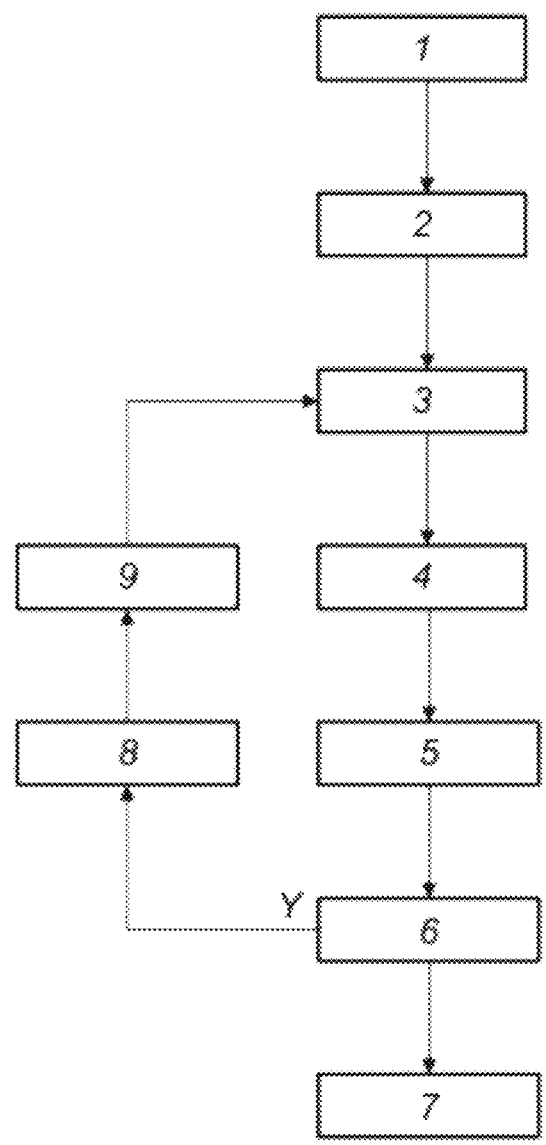
FIG. 2 illustrates the basic methodology of the disclosure in accordance with example embodiments.

According to a first example embodiment and referring now to FIG. 2, the vehicle is in a standby mode in the first step 1. The user parks the car and the system goes to step 2 where the various conditions are monitored. In step 3 the user is asked for what time the car should be ready for departure. Preferably, the system suggests a time of departure based on data obtained by the system through access to for instance the calendar of the user as a result of the conditions being monitored in step 2. The time is entered by the user in step 3.

In step 4 the probability of time for use of the car is determined and in the next step 5 the timer is set such that the waking up of the vehicle from deep sleep mode is started at a predetermined time prior to the expected time of departure. For instance, the colder it is compared to the desired temperature in the vehicle compartment the earlier the system would have to start with the pre acclimatization. Thus, according to this example embodiment the next step after step 5 would be step 6 where the vehicle is put into deep sleep mode and when the time set in the timer is reached the pre acclimatization is performed in step 7.

According to an alternative example embodiment, the time set on the timer is compared to the actual time in step 6. If the actual time is less than the time left according to the timer the system goes to step 8 where the system puts the vehicle in deep sleep mode a predetermined time that is before the time of expected departure. This function is an option in case the system of the vehicle should be able to get updated information. One advantage is that the timer can be set to a different time if conditions are changed. For instance, a flight is late that the user is on or the weather somehow changes such that it would be desirable to have an earlier startup of the pre acclimatization.

In step 9 of this alternative example embodiment the vehicle system is awakened and the system continues to step 3 where the conditions are monitored. Again, as in the first example embodiment, the probability for when the vehicle will be used is determined in step 4, the timer is set in step 5 and the actual time is compared to the time set in the timer in step 6 and continues to step 8 if the actual time is less than the time left according to the timer and the system puts the vehicle into deep sleep mode a predetermined time and so on. If the actual time in step 6 is equal to the time set in the timer the system goes to step 7 and performs the pre acclimatization.

The predetermined time of step 8 could be varied depending on the time until the expected time of departure such that it gets shorter the closer it gets to the expected time of departure.

Figure 3:
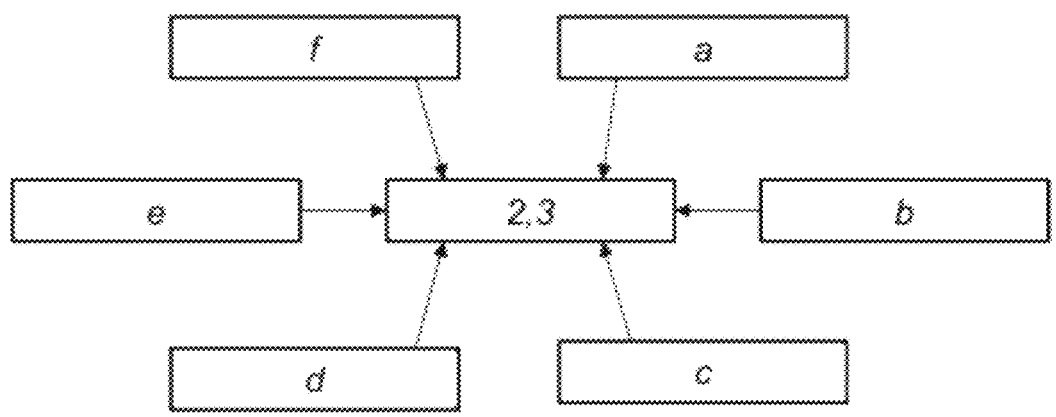
FIG. 3 is an enlarged part of a step from FIG. 2.

Examples of conditions monitored in step 2 of the first example embodiment and step 3 of the alternative example embodiment is illustrated in FIG. 3. Where:
a is time and date,
b is vehicle location,
c is information update from external database,
d is information update from remote device,
e is time until departure, and
f is driver location.

These conditions could of course be varied and could include input from further sensors or databases such as an historical database.

It is to be understood that the present invention is not limited to the embodiments described above and illustrated in the drawings; rather, the skilled person will recognize that many changes and modifications may be made within the scope of the appended claims. For example, the system could be equipped with a function to allow for both having a setting where the vehicle system cannot be contacted remotely prior to the expected time of departure such as in the first example embodiment and accordingly a setting where the system is active for short instances at predetermined intervals to allow for information update.

What is claimed is:

1. A method for activating a pre acclimatization system of the passenger compartment of a vehicle, the method comprising:
monitoring an operational state of the vehicle, wherein the vehicle is on when said operational state corresponds to a first state, wherein the vehicle is off when said operational state corresponds to a second state, and wherein when said operational state corresponds to said second state the method further comprises:
monitoring a plurality of conditions, wherein said plurality of conditions are selected from the group comprising current time and date, a driver appointment schedule, a historical database, wherein said monitoring step is performed by a system controller incorporated into the vehicle;
determining the most probable time of departure of the vehicle from a present location based on said plurality of conditions monitored by said system controller;
suggesting time of departure to a driver;

monitoring reply from said driver;
setting timer for activating said pre acclimatization according to reply from said driver;
activating a sleep mode for a vehicle system; and
subsequently, after activating the sleep mode, performing said pre acclimatization.

2. The method according to claim 1, further comprising:
waking the vehicle system at predetermined intervals;
monitoring present plurality of conditions;
determining the most probable time of departure of the vehicle based on the present conditions monitored;
determining whether the most probable time of departure differs from the previously set time of departure,
setting timer for activating said pre acclimatization according to the most probable time of departure; and
activating said sleep mode for the vehicle system.

3. The method according to claim 2, wherein the predetermined intervals is set to decrease in time when getting closer to the time of departure.

4. The method according to claim 2, wherein the predetermined intervals is set for waking the vehicle system at least once every 24 hours if the set time of departure is more than 24 hours ahead.

5. The method according to claim 2, wherein the predetermined intervals is set for waking the vehicle system at least once every 6 hours if the set time of departure is less than 24 hours ahead.

6. The method according to claim 1, wherein said driver appointment schedule is monitored by said system controller by performing the step of synchronizing an on-board calendar with a calendar contained on a remote system, wherein said remote system is selected from a group comprising a cellular phone, a laptop computer, a tablet computer, a personal digital assistant, a computer system, a smart watch, and a network based computing system.

7. The method according to claim 1, wherein the activating of said pre acclimatization system comprises:
determining a current passenger compartment temperature and comparing it to a preset temperature, wherein if said current passenger compartment temperature is lower than said preset temperature said step of activating said pre acclimatization system further comprises the step of activating a passenger compartment heater.

8. The method according to claim 7, wherein said passenger compartment heater is selected from the group comprising a heating, ventilation and air conditioning (HVAC) heater, a seat heater, and a steering wheel heater.

9. The method according to claim 7, wherein said activating of said passenger compartment heater further comprises activating a compartment air circulation system.

10. The method of claim 1, wherein the activating of said pre acclimatization system comprises:
determining a current passenger compartment temperature and comparing it to a preset temperature, wherein if said current passenger compartment temperature is higher than said preset temperature said step of activating said pre acclimatization system further comprises the step of activating a heating, ventilation and air conditioning (HVAC) cooling system.

11. The method of claim 10, wherein the activating of said HVAC cooling system further comprises activating a compartment air circulation system.

12. The method of claim 10, wherein the activating of said HVAC cooling system further comprises:
monitoring an elapsed time corresponding to said activating of the HVAC cooling system; and
comparing said elapsed time to a preset time interval, wherein if said elapsed time is less than said preset time interval said system controller continues to perform said step of activating said HVAC cooling system, and wherein if said elapsed time is greater than said preset time interval said system controller terminates said step of activating said HVAC cooling system and activates a compartment air circulation system for a preset period of time.

13. The method of claim 1, further comprising:
determining a current passenger compartment temperature:
determining an ambient air temperature; and
comparing said current passenger compartment temperature to a preset temperature, wherein if said current passenger compartment temperature is higher than said preset temperature said method further comprises comparing said current passenger compartment temperature to said ambient temperature, wherein if said ambient air temperature is lower than said current passenger compartment temperature by a preset margin, said activation of said pre acclimatization system further comprises activating a ventilation system with external air intake.

14. The method according to claim 1, wherein communication with the vehicle for controlling said pre acclimatization system is not possible when said sleep mode is activated.

15. A method for activating a pre acclimatization system of the passenger compartment of a vehicle, the method comprising:
monitoring an operational state of the vehicle, wherein the vehicle is on when said operational state corresponds to a first state, wherein the vehicle is off when said operational state corresponds to a second state, and wherein when said operational state corresponds to said second state the method further comprises:
monitoring a plurality of conditions, wherein said plurality of conditions are selected from the group comprising current time and date, a driver appointment schedule, a historical database, wherein said monitoring step is performed by a system controller incorporated into the vehicle;
determining the most probable time of departure of the vehicle from a present location based on said plurality of conditions monitored by said system controller;
suggesting time of departure to said driver;
monitoring reply from said driver;
setting timer for activating said pre acclimatization according to reply from said driver; and
activating a sleep mode for a vehicle system, wherein communication with the vehicle for controlling said pre acclimatization system is not possible when said sleep mode is activated.

16. A method for activating a pre acclimatization system of the passenger compartment of a vehicle, the method comprising:
monitoring an operational state of the vehicle, wherein the vehicle is on when said operational state corresponds to a first state, wherein the vehicle is off when said operational state corresponds to a second state, and wherein when said operational state corresponds to said second state the method further comprises:
monitoring a plurality of conditions, wherein said plurality of conditions are selected from the group comprising current time and date, a driver appointment schedule, a historical database, wherein said monitoring step is performed by a system controller incorporated into the vehicle;

determining the most probable time of departure of the vehicle from a present location based on said plurality of conditions monitored by said system controller;

suggesting time of departure to a driver;

monitoring reply from said driver;

setting timer for activating said pre acclimatization according to reply from said driver;

activating a sleep mode for a vehicle system, waking the vehicle system at predetermined intervals;

monitoring present plurality of conditions;

determining the most probable time of departure of the vehicle based on the present conditions monitored;

determining whether the most probable time of departure differs from the previously set time of departure, setting timer for activating said pre acclimatization according to the most probable time of departure; and activating said sleep mode for said vehicle system.

17. The method according to claim 16, wherein the predetermined intervals is set to decrease in time when getting closer to the time of departure.

18. The method according to claim 16, wherein the predetermined intervals is set for waking the vehicle system at least once every 24 hours if the set time of departure is more than 24 hours ahead.

19. The method according to claim 16, wherein the predetermined intervals is set for waking the vehicle system at least once every 6 hours if the set time of departure is less than 24 hours ahead.

20. The method according to claim 1, wherein upon expiration of said timer, the sleep mode is deactivated and said pre acclimatization is performed.

* * * * *